United States Patent [19]

Gladisch et al.

[11] Patent Number: 4,548,386
[45] Date of Patent: Oct. 22, 1985

[54] GATE VALVE

[75] Inventors: Manfred Gladisch, Herne; Erwin Winklmann, Oberhausen, both of Fed. Rep. of Germany

[73] Assignee: Deutsche Babcock Werke Aktiengesellschaft, Oberhausen, Fed. Rep. of Germany

[21] Appl. No.: 523,633

[22] Filed: Aug. 15, 1983

[30] Foreign Application Priority Data

Jun. 9, 1983 [DE] Fed. Rep. of Germany ....... 3320809

[51] Int. Cl.4 ............................................... F16K 3/12
[52] U.S. Cl. ................................................... 251/327
[58] Field of Search .................... 251/327, 195

[56] References Cited

U.S. PATENT DOCUMENTS

| | | | |
|---|---|---|---|
| 2,124,334 | 7/1938 | Gray | 251/327 |
| 2,964,291 | 12/1960 | Williams et al. | 251/327 |
| 3,017,158 | 1/1962 | Hansen et al. | 251/195 X |
| 3,215,399 | 11/1965 | McInerney et al. | 251/327 X |
| 4,098,489 | 7/1978 | Anders et al. | 251/327 |

FOREIGN PATENT DOCUMENTS 1066394 10/1959 Fed. Rep. of Germany ...... 251/327

*Primary Examiner*—Arnold Rosenthal
*Attorney, Agent, or Firm*—Max Fogiel

[57] ABSTRACT

A gate valve having two wedge-shaped disks that are suspended on a shaft and have sealing surfaces. The disks form an angle of 2°–10° to the shaft. The mutually facing sides of the disks are supported on a non-resilient ring with conical or spherical faces that rest against corresponding mating surfaces. The ring is positioned at the level of the sealing surfaces. The conical faces, or the secants of the spherical segment that form the conical faces, are at an angle of 15°–50° to the longitudinal axis of the shaft.

5 Claims, 4 Drawing Figures

GATE VALVE

BACKGROUND OF THE INVENTION

A gate valve with wedge-shaped disks has a cylindrical thrust bolt between its disks, which rest in the longitudinal axis of the connections when the valve is closed. The force needed to close the valve is transmitted to the disks through the shaft, through a compression screw extending from the shaft, and through the thrust bolt. The disks are uniformly distributed over two sealing surfaces at each side of the housing. Since the shaft of the known wedge-disk gate valve exhibits preliminary travel, the force of compression must be released through the compression screw and thrust bolt when the shaft is lifted to facilitate opening the valve. Nevertheless, the opening moment must be 1.5 times the closure moment to ensure smooth opening of the valve.

German Patent Application No. P 32 06 190.0 describes a gate valve with wedge-shaped disks supported against each other on at least two resilient rings that can be mutually displaced axially. These rings are positioned at the level of the disk sealing surfaces. This design diminishes the forces exerted on the sealing surfaces when the valve is opened.

The present invention is intended as a modification of the position of the disks in a gate valve of the aforesaid type that will allow the valve to be operated with lower opening forces.

SUMMARY OF THE INVENTION

All the characteristics of the present invention combine to ensure ideal opening and closing of the valve. The disks, which are in the form of a mathematically perfect wedge, precisely fit the faces of the valve in conformity with the mathematical and physical laws that govern such relationships. Two types of force—wedge and friction—reinforce each other as the plates are introduced and retracted. One half of the wedge force acts on each disk sealing surface, and each half acts in the same direction for both opening and closing. In the opening direction each component tends to unwedge a disk from its closed state. The frictional force components oppose both the opening and the closing motions. The closed state demands the type of self-locking that can be attained with conventional materials and appropriate wedge angles. If the wedge is considered to be mathematically perfect however, it will be obvious that the wedge forces will promote the opening of the system and oppose its closure forces, assuming that the coefficients of friction for retention and sliding are equal. The force relations will consequently reverse under the given assumptions, with opening force becoming weaker than closure force.

Several embodiments of the invention will now be specified by way of example with reference to the drawings.

DESCRIPTION OF THE PREFERRED EMBODIMENTS

Figure 1:
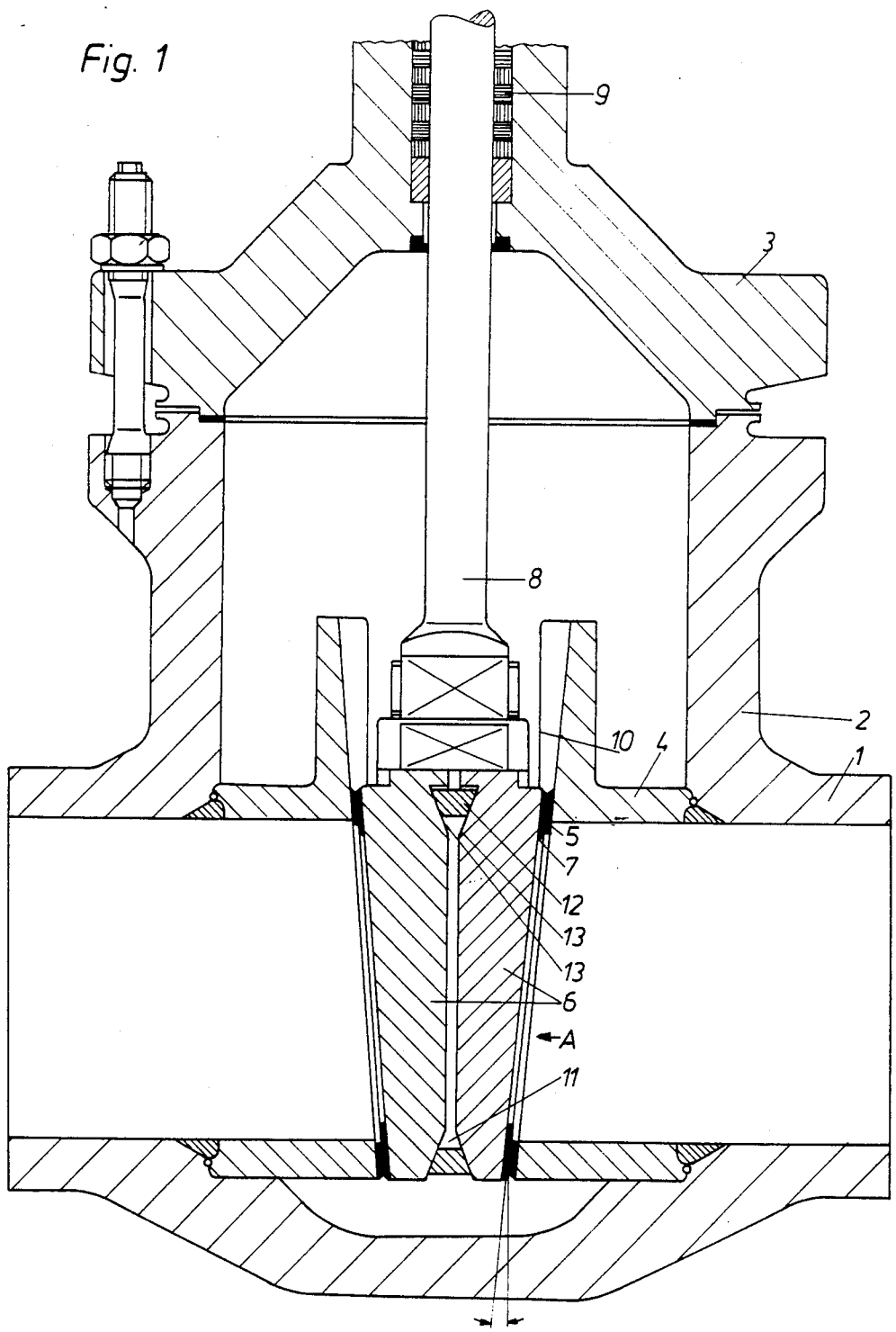
FIG. 1 is a longitudinal section through a gate valve in accordance with the invention, FIG. 2 a side view of one of the disks as seen from direction A, and FIGS. 3 and 4 two different embodiments of the disks in accordance with the invention.
Figure 2:
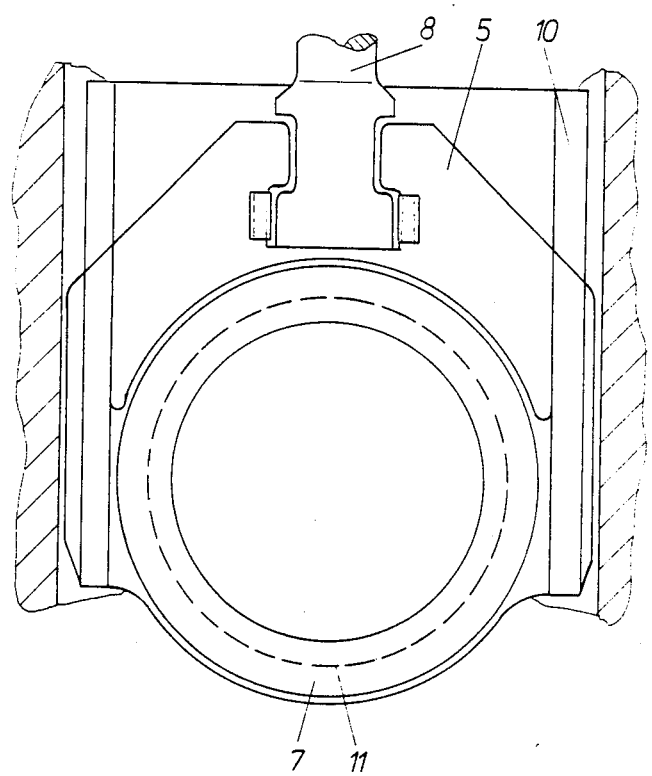

The gate valve illustrated in FIG. 1 has a socket 1 on each side and a housing 2 that is sealed off with a cap 3. A housing face ring 4 that supports sealing surfaces 5 for the housing is connected to each socket 1.

A gate consisting of two disks 6 suspended on a shaft 8 runs along sealing surfaces 5 on housing 2. Disks 6 are wedge-shaped. There are sealing surfaces 7 on the outside of disk 6 that mate with the sealing surfaces 5 on the housing when the valve is closed. The sealing surfaces 7 on disks 6 are at an angle of 2°–10° to the longitudinal axis of shaft 8.

Shaft 8 extends through cap 3 and is sealed off with a packing box 9. An unillustrated adjustment mechanism engages the top of shaft 8 and can be employed to adjust its axial displacement. Above housing face ring 4 are guides 10, which guide disks 6 as they are raised and lowered to open and close the valve.

Figure 3:
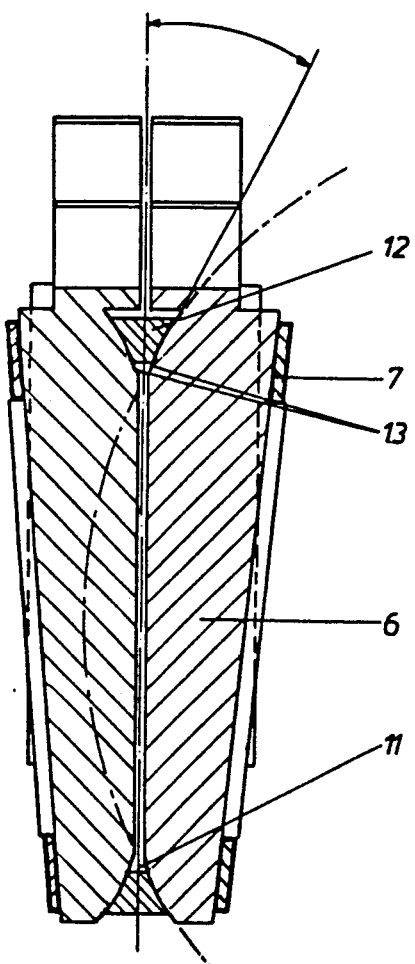
Figure 4:
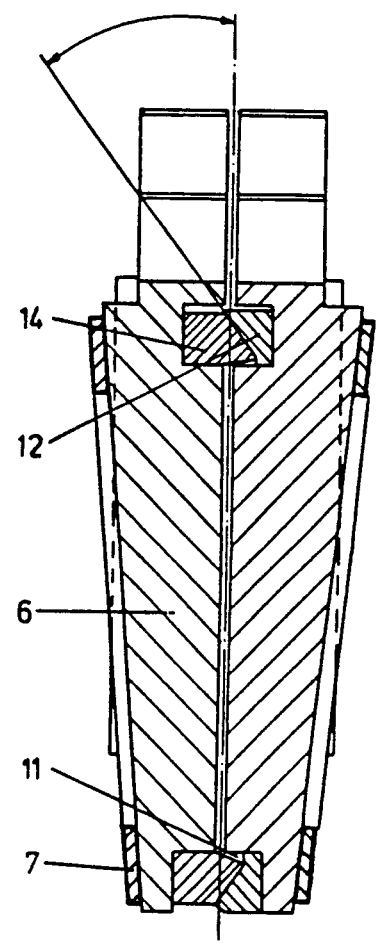

As will be evident in particular from FIGS. 3 and 4, there is an annular recess 11 on the side of each disk 6 that faces the other disk. A non-resilient ring 12 that in the embodiment illustrated in FIG. 3 has two conical faces, preferably positioned on a spherical surface, is inserted in recess 11. The conical faces, or the secants of the spherical segment that form the conical faces, are at an angle of 15°–50° to the longitudinal axis of shaft 8.

The faces of non-resilient ring 12 are positioned against annular conical or spherical mating surfaces 13. In the embodiment illustrated in FIG. 3 mating surfaces 13 are in one piece with disks 6 in the form of annular surfaces inside recess 11.

The embodiment illustrated in FIG. 4 has two non-resilient rings 12 and 14, each with a conical or spherical face. Ring 14 is mounted stationary in recess 11 and secured with one of disks 6. Ring 12 can be movable or also secured stationary on the other disk 6. In this embodiment as well the faces of rings 12 and 14 are at an angle of 15°–50° to the longitudinal axis of shaft 8.

When disks 6 are inserted between the sealing surfaces 5 on housing 2, the spherical faces ensure that the sealing surfaces 5 and 7 between disks 6 and face ring 4 will fit precisely. Ring 12, which can be moved along mating surfaces 13, allows disks 6 to move at an angle without being displaced coaxially.

We claim:

1. A valve comprising: a shaft; two wedge-shaped disks suspended on said shaft; said disks having annular sealing surfaces on their outside; a compression member of supporting said disks against each other on the inside, said disks forming an angle of 2°–10° with respect to the longitudinal axis of the shaft; said compression member being positioned at the level of the sealing surfaces on said disks and comprising a ring-shaped member with spherical faces that rest against corresponding mating surfaces, said spherical faces forming an angle of 15°–50° with the longitudinal axis of the shaft; said ring-shaped member being located between said disks, spaced from and disconnected from said shaft for preventing direct loading by said shaft, said disks being slidable relative to one another along said spherical faces of said ring-shaped member and along corresponding mating surfaces of said disks, said disks lying against seating rings of a disk housing corresponding to properties of a mathematically precise wedge so that opening force is less than closing force of the valve.

2. A valve as defined in claim 1, including guides on face rings for the disks.

3. A valve as defined in claim 1, wherein secants of a spherical segment forming said spherical surfaces are at an angle of 15°–50° with repsect to the longitudinal axis of the shaft.

4. A valve as defined in claim 1, wherein said ring is displaceable along the spherical faces.

5. A valve comprising: a shaft; two wedge-shaped disks suspended on said shaft; said disks having annular sealing surfaces on their outside; a compression member for supporting said disks against each other on the inside, said disks forming an angle of 2°–10° with respect to the longitudinal axis of the shaft; said compression member being positioned at the level of the sealing surfaces on said disks and comprising a ring-shaped member with spherical faces that rest against corresponding mating surfaces, said spherical faces forming an angle of 15°–50° with the longitudinal axis of the shaft; said ring-shaped member being located between said disks, spaced from and disconnected from said shaft for preventing direct loading by said shaft, said disks being slidable relative to one another along said spherical faces of said ring-shaped member and along corresponding mating surfaces of said disks, said disks lying against seating rings of a disk housing corresponding to properties of a mathematically precise wedge so that opening force is less than closing force of the valve; said mathematically precise wedge fitting precisely faces of the valve for producing wedge and friction forces, one-half of the wedge force acting on each disk sealing surface and each half acting in the same direction for both opening and closing, each force component tending to unwedge a disk from its closed state in opening direction of the valve, the frictional force components opposing opening and closing motions of the valve, the wedge forces aiding opening of the valve and opposing closing forces so that the opening force of the valve is less than the closing force of the valve.

* * * * *